United States Patent
Kano (10) Patent No.: US 8,984,410 B2
(45) Date of Patent: Mar. 17, 2015

(54) IMAGE PROCESSING APPARATUS, DATA PROCESSING METHOD THEREFOR, AND RECORDING MEDIUM

(75) Inventor: Takahiro Kano, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 415 days.

(21) Appl. No.: 13/048,423

(22) Filed: Mar. 15, 2011

(65) Prior Publication Data
US 2011/0231774 A1    Sep. 22, 2011

(30) Foreign Application Priority Data

Mar. 18, 2010   (JP) ................................. 2010-063364

(51) Int. Cl.
*G06F 3/00*    (2006.01)
*G06F 3/12*    (2006.01)
(Continued)

(52) U.S. Cl.
CPC ........ *G06F 3/1285* (2013.01); *G06F 17/30873* (2013.01); *G06F 3/1204* (2013.01); *G06F 3/122* (2013.01); *G06F 3/1228* (2013.01); *G06F 3/1229* (2013.01); *H04N 1/00204* (2013.01); *H04N 1/00244* (2013.01); *H04N 1/00464* (2013.01); *H04N 2201/0039* (2013.01); *H04N 2201/0094* (2013.01)
USPC .......................................... 715/738; 715/740

(58) Field of Classification Search
CPC ................................................ G06F 17/30873
USPC ................................................. 715/738–740
See application file for complete search history.

(56) References Cited

U.S. PATENT DOCUMENTS 5,754,772 A * 5/1998 Leaf .............................. 709/203
5,958,013 A * 9/1999 King et al. ..................... 709/227
6,185,588 B1 * 2/2001 Olson-Williams et al. .... 715/236
(Continued)

FOREIGN PATENT DOCUMENTS

JP    7-110763 A    4/1995
JP    2002-117005 A    4/2002
(Continued)

OTHER PUBLICATIONS

Shirai, Yuichiro, "*To perfectly master security configuration on Linux: for basic through advanced level learners*" Nikkei Linux (2002), vol. 4, No. 1, pp. 52-62, Japan, Nikkei BP, (with partial English Translation).

(Continued)

*Primary Examiner* — William Titcomb
(74) *Attorney, Agent, or Firm* — Buchanan Ingersoll & Rooney PC (57) ABSTRACT

An image processing apparatus comprising: a display; an embedded web browser that displays hypertext-coded information on the display; a data input and output module that inputs and outputs hypertext-coded data and can be accessed from the embedded web browser and another web browser of an external machine; a judgment portion that judges which the data input and output module is accessed from, the embedded web browser or the web browser of the external machine; a data generator that generates different display data depending on the judgment made by the judgment portion; and a transmitter that transmits the display data generated by the data generator, to the embedded web browser or the web browser of the external machine.

9 Claims, 4 Drawing Sheets

(51) Int. Cl.
  *G06F 17/30* (2006.01)
  *H04N 1/00* (2006.01)

(56) References Cited

U.S. PATENT DOCUMENTS

| | | | | |
|---|---|---|---|---|
| 6,188,400 | B1 * | 2/2001 | House et al. | 715/805 |
| 6,223,213 | B1 * | 4/2001 | Cleron et al. | 709/206 |
| 7,464,333 | B2 * | 12/2008 | Yamamoto | 715/273 |
| 7,707,243 | B2 * | 4/2010 | Kobayashi et al. | 709/203 |
| 7,739,683 | B2 * | 6/2010 | Mitomo et al. | 717/174 |
| 7,934,217 | B2 * | 4/2011 | Reddy et al. | 719/311 |
| 7,937,405 | B2 * | 5/2011 | Anderson et al. | 707/770 |
| 8,122,363 | B1 * | 2/2012 | Appelman | 715/752 |
| 8,135,864 | B2 * | 3/2012 | Simpson et al. | 709/248 |
| 8,203,731 | B2 * | 6/2012 | Reese et al. | 358/1.15 |
| 2002/0133606 | A1 * | 9/2002 | Mitomo et al. | 709/229 |
| 2005/0114766 | A1 * | 5/2005 | Yamamoto | 715/527 |
| 2006/0036718 | A1 | 2/2006 | Mitomo et al. | |
| 2007/0150597 | A1 * | 6/2007 | Hasan et al. | 709/226 |
| 2009/0064298 | A1 * | 3/2009 | Yamamoto et al. | 726/6 |
| 2009/0177786 | A1 * | 7/2009 | Takahashi | 709/228 |
| 2009/0313541 | A1 * | 12/2009 | Dan | 715/273 |
| 2010/0208300 | A1 * | 8/2010 | Kamasuka | 358/1.15 |

FOREIGN PATENT DOCUMENTS

| | | |
|---|---|---|
| JP | 2004-086611 A | 3/2004 |
| WO | WO 2004/070590 A1 | 8/2004 |

OTHER PUBLICATIONS

Office Action (Notification of Reasons for Refusal) dated Mar. 13, 2012, issued in corresponding Japanese Patent Application No. 2010-063364, and an English Translation thereof. (6 pages).

* cited by examiner

001
IMAGE PROCESSING APPARATUS, DATA PROCESSING METHOD THEREFOR, AND RECORDING MEDIUM

This application claims priority under 35 U.S.C. §119 to Japanese Patent Application No. 2010-063364 filed on Mar. 18, 2010, the entire disclosure of which is incorporated herein by reference in its entirety.

BACKGROUND OF THE INVENTION

1. Technical Field

The present invention relates to an image processing apparatus such as an image forming apparatus having: a web browser embedded thereon to display hypertext-coded information on a display; and a hypertext-coded data input/output module that can be accessed from this web browser or another web browser of an external machine, a data processing method for the image processing apparatus, and a recording medium having a data processing program stored thereon to make a computer of the image processing apparatus implement the data processing method.

2. Background Technology

The following description sets forth the inventor's knowledge of related art and problems therein and should not be construed as an admission of knowledge in the prior art.

Some of the image processing apparatuses such as multi-functional digital image forming apparatuses called MFPs (Multi Function Peripherals) are provided as web servers, or have a web browser embedded thereon.

With an embedded web browser, such an image processing apparatus is capable of displaying hypertext-coded information on a display of, for example, an operation panel, and accessing a web server when operated via a screen thereof. Meanwhile, such an image processing apparatus is also capable of being accessed from an external machine having a web browser, for example, a personal computer, via a network such as the Internet.

Therefore, users are allowed to access such an image processing apparatus to give an instruction to execute processing, from a web browser of an external machine such as a personal computer. Also, when coming to such an image processing apparatus, users are allowed to give an instruction from an embedded web browser thereof by operating an operation panel thereof. However, it always happens that what operation they require the image processing apparatus to perform often depends on whether the operation panel thereof or the external apparatus they operate when accessing the image processing apparatus.

In other words, the users are supposed to come to the image processing apparatus to give an instruction relating to input/output of a document, for example, a copy, scan, or facsimile-transmission instruction, by operating the operation panel. Meanwhile, they often check the state of the image processing apparatus, confirm print execution, perform various settings, or change the settings, by operating the external machine.

As suggested in Japanese Unexamined Patent Publication No. H07-110763, there is an edit apparatus that is capable of allowing users to easily customize their own user interfaces of an application. And as suggested in Japanese Unexamined Patent Publication No. 2004-086611, there is an image forming apparatus that is capable of switching the language depending on the terminal that accesses the image forming apparatus.

However, the users always obtain the same operation screen, either on the operation panel of the conventional image processing apparatus having the embedded web browser, or the external apparatus, whichever they operate when accessing the image processing apparatus, despite what operation they require the image processing apparatus to perform often depends on it. That makes the user operability quite poor.

Therefore, the technologies in the Japanese Unexamined Patent Publications No. H07-110763 and No. 2004-086611 do not provide a perfect solution to the problems described above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that is capable of displaying different operation screen depending on from which the image processing apparatus is accessed, an embedded web browser thereof by operating an operation panel thereof or another web browser of an external machine such as a personal computer.

It is another object of the present invention to provide a data processing method for the image processing apparatus, which is capable of displaying different operation screen depending on from which the image processing apparatus is accessed, an embedded web browser thereof by operating an operation panel thereof or another web browser of an external machine such as a personal computer.

It is yet another object of the present invention to provide a recording medium having a data processing program stored thereon to make a computer of the image processing apparatus implement the data processing method.

According to a first aspect of the present invention, an image processing apparatus includes:

a display;

an embedded web browser that displays hypertext-coded information on the display;

a data input and output module that inputs and outputs hypertext-coded data and can be accessed from the embedded web browser and another web browser of an external machine;

a judgment portion that judges which the data input and output module is accessed from, the embedded web browser or the web browser of the external machine;

a data generator that generates different display data depending on the judgment made by the judgment portion; and a transmitter that transmits the display data generated by the data generator, to the embedded web browser or the web browser of the external machine.

According to a second aspect of the present invention, a data processing method for an image processing apparatus includes:

judging which a data input and output module that inputs and outputs hypertext-coded data and can be accessed from an embedded web browser displaying hypertext-coded information on a display, and another web browser of an external machine, is accessed from, the embedded web browser or the web browser of the external machine;

generating different display data depending on the judgment; and transmitting the generated display data to the embedded web browser or the web browser of the external machine.

According to a third aspect of the present invention, a recording medium has a data processing program stored thereon to make a computer of an image processing apparatus execute:

judging which a data input and output module that inputs and outputs hypertext-coded data and can be accessed from an embedded web browser displaying hypertext-coded information on a display, and another web browser of an external machine, is accessed from, the embedded web browser or the web browser of the external machine;

generating different display data depending on the judgment; and transmitting the generated display data to the embedded web browser or the web browser of the external machine.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying figures.

Figure 1:
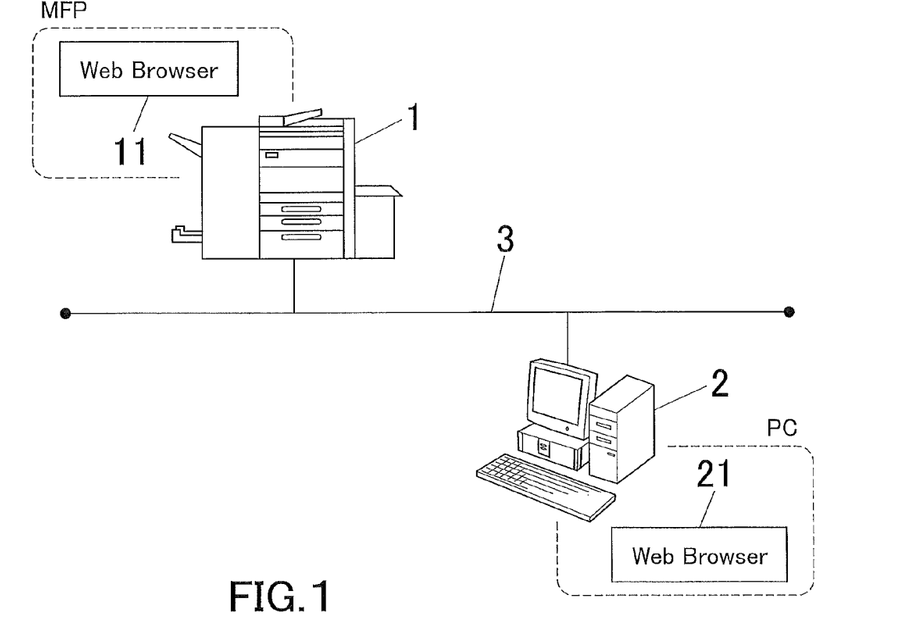
FIG. 1 is a view illustrating a construction of a data processing system including an image processing apparatus according to one mode of implementing the present invention.

FIG. 1 is a view illustrating a construction of a data processing system including an image processing apparatus according to one mode of implementing the present invention.

As illustrated in FIG. 1, this data processing system includes an image forming apparatus 1 as an image processing apparatus and a personal computer (PC) 2 as an external machine, connected to each other via a network 3 such as the Internet.

And as described above, a MFP such as a multifunctional digital image forming apparatus having a plurality of functions, for example, the copy function, the print function, the scanning function, and the facsimile function is employed as the image forming apparatus 1. As used herein below, the image forming apparatus will also be referred to as "MFP". The image forming apparatus 1 has a web browsing portion 11 that serves as a web browser which is application software that displays hypertext-coded information on an operation panel.

Also, the PC 2 has a web browsing portion 21 that serves as a web browser which allows the PC 2 to access the image forming apparatus 1 via the network 3 according to hypertext-coded information.

In this figure, the web browsing portions 11 and 21 are referred to as "web browser" in a simple manner.

Figure 2:
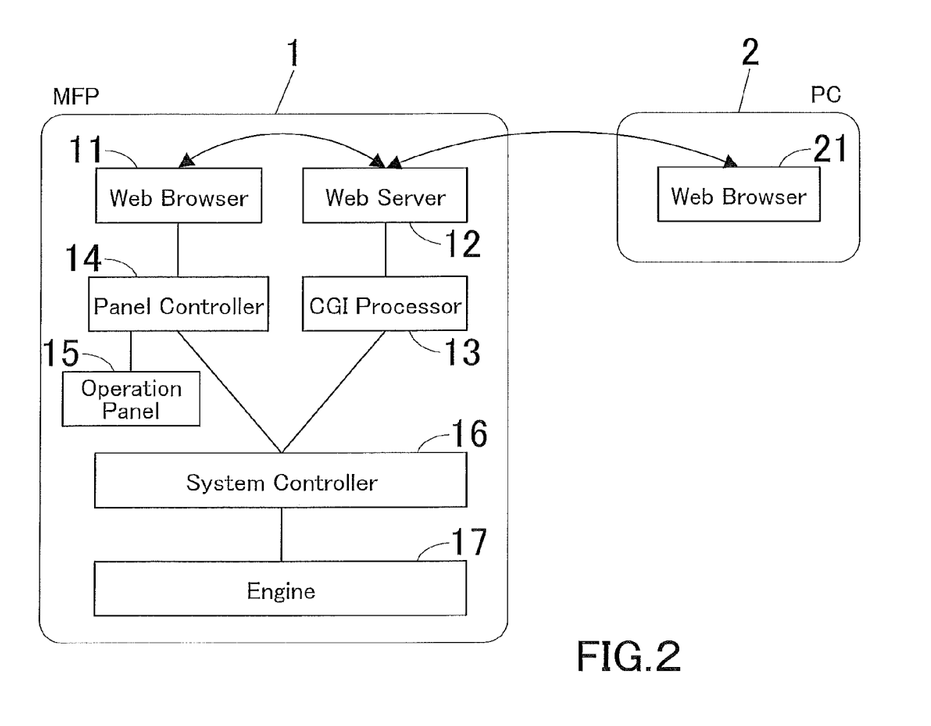
FIG. 2 is a block diagram illustrating a functional configuration of main members of an image forming apparatus.

FIG. 2 is a block diagram illustrating a functional configuration of main members of the image forming apparatus 1.

The image forming apparatus 1 includes the web browsing portion 11, a web server 12, a CGI (Common Gateway Interface) processor 13, a panel controller 14, an operation panel 15, a system controller 16, and an engine 17.

The web browsing portion 11 implements a web browser installed on the image forming apparatus 1, and by implementing the web browser, it allows the panel controller 14 to display hypertext-coded information on the operation panel 15, and transmits operation information or the like entered from the operation panel 15, to the web server 12.

The web server 12 receives via the web browsing portion 11, data entered from the operation panel 15, also receives data from the web browsing portion 21 of the PC 2, and transmits necessary data to the web browsing portion 11 and the PC 2. The web server 12 and the CGI processor 13 jointly serve as a hypertext-coded data input/output module.

The CGI processor 13 is an interface that executes processing according to a processing request entered from the operation panel 15 then transmitted to the web server 12, and a processing request transmitted from the PC 2 to the web server 12.

The operation panel 15 includes: a hardware key portion with a numerical keypad, a Start key, a Reset key, and the like; and a touch-panel display such as liquid crystal display (either of them is not illustrated in this figure).

The system controller 16 integrally controls the image forming apparatus 1, and the engine 17 prints image data on paper.

Figure 3:
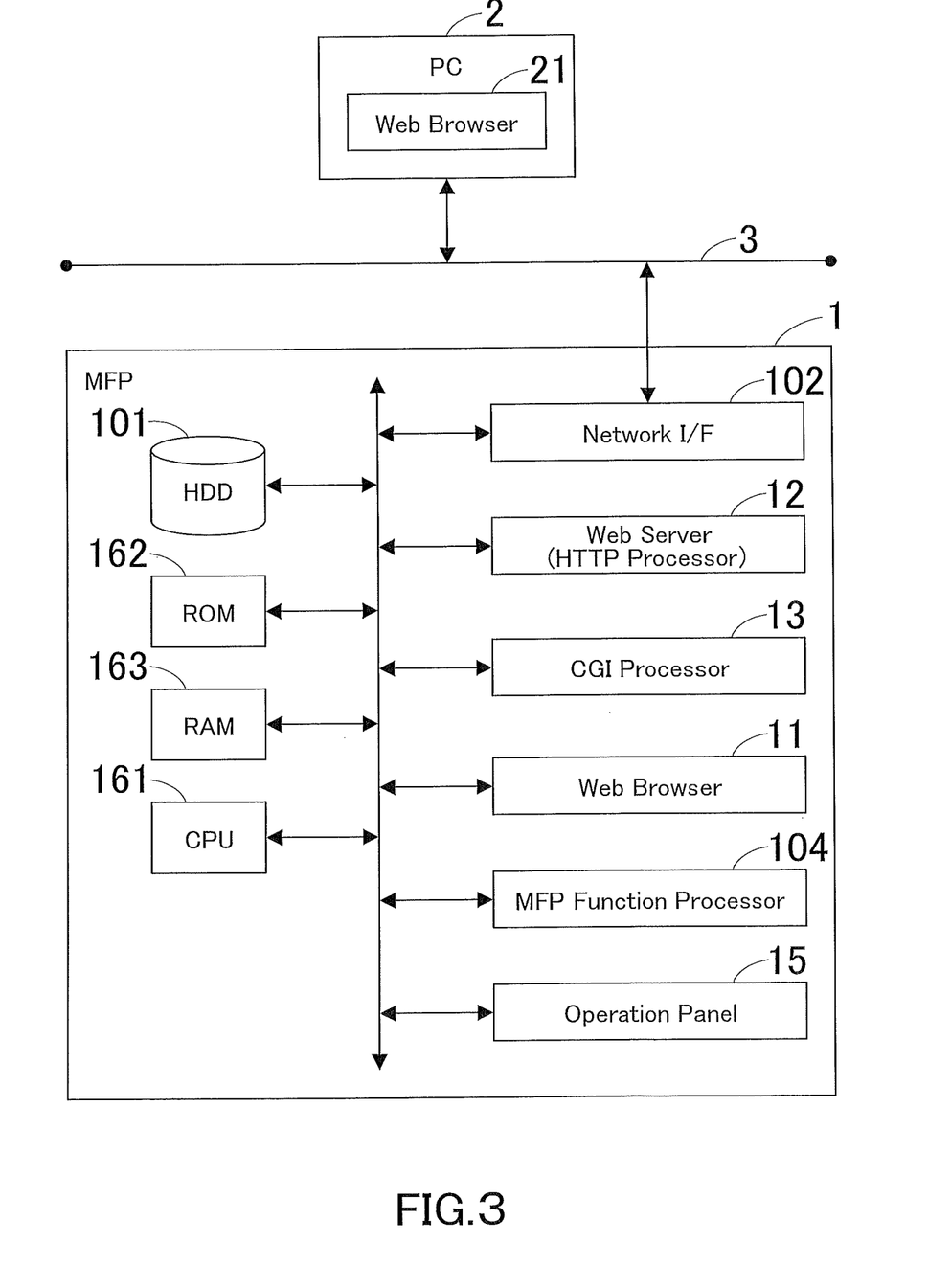
FIG. 3 is a block diagram illustrating a configuration of the image forming apparatus in more detail.

FIG. 3 is a block diagram illustrating a configuration of the image forming apparatus in more detail.

The image forming apparatus 1 includes a CPU 161, a ROM 162, a RAM 163, a memory 101, a network interface (I/F) 102, the above-mentioned web browsing portion 11, the above-mentioned web server (HTTP processor) 12, the above-mentioned CGI processor 13, the operation panel 15, and a MFP function processor 104.

The CPU 161 integrally controls all operations of the image forming apparatus 1. Specifically, the CPU 16 implements various functions, for example, the copy function, the print function, and the facsimile function. Furthermore, it makes the web server 12 receive via the web browsing portion 11, data entered from the operation panel 15, also makes the web server 12 receive data from the web browsing portion 21 of the PC 2, and makes the CGI processor 13 to process the data.

The ROM 162 stores an operation program for the CPU 161, and the RAM 163 provides a work area for the CPU 161 to execute processing. The CPU 161, the ROM 162, the RAM 163, and the like jointly serve as the system controller 16.

The memory 101 is a hard disk drive (HDD) for example, and it stores data read out by a scanner not illustrated in this figure, data received from a personal computer, various programs, and the like.

The network interface 102 transmits and receives data to and from an external machine such as the PC 2, via the network 3.

The web browsing portion 11, the web server 12, the CGI processor 13, and the operation panel 15 illustrated in FIG. 2 are also used in this figure. The web server 12 and the CGI processor 13 generate HTML (HyperText Markup Language) data including information of the image forming apparatus 1, with use of an internal API (Application Program Interface) of the image forming apparatus 1.

The MFP function processor 104 has a mechanism to implement the functions of the image forming apparatus 1, which corresponds to: the engine 17 also used in FIG. 2; a scanner that reads out image data from a document; and an image processor that processes image data read out form a document, collectively.

Operations of the image forming apparatus 1 illustrated in FIGS. 1 to 3 will be described herein below.

A user accesses the web server 12 of the image forming apparatus 1 by operating the operation panel 15, or alternatively accesses the web server 12 of the image forming apparatus 1 via the network interface 102 by operating the external PC 2. As used herein below, accessing the web server 12 from the operation panel 15 will also be referred to as "local access", and accessing the web server 12 from the PC 2 will also be referred to as "remote access". The embedded web browser of the image forming apparatus 1 will also be referred to as "local browser", and the web browser of the PC 2 will also be referred to as "remote browser".

The web server 12 and the CGI processor 13 execute processing according to a request received from the embedded web browsing portion 11 or the PC 2, and generate HTML data including information of the image forming apparatus 1, with use of the internal API of the image forming apparatus 1. The generated data is returned to the web browsing portion 11 or the PC 2. That allows using the image forming apparatus 1 via the web browser (a screen displayed by the web browser).

When the web browsing portion 11 or the PC 2 transmit to the web server 12, a request to perform a data processing operation selected or set by the web browsing portion 11 or 21, for example, a POST request including CGI parameters and the like, the CGI processor 13 will perform the data processing operation (for example, it will perform a copy operation or change an administrator's password) with use of the system controller 16 (the internal API of the image forming apparatus 1).

The web server 12 and the CGI processor 13 judge which it was, local access from the local browser or remote access from the remote browser.

Specifically, the web server 12 picks an IP address, the type of the web browser, user agent information, and the like among the HTTP (HyperText Transfer Protocol) data when receiving the request, and transfers them to the CGI processor 13. Then, based on the information, the CGI processor 13 makes a judgment.

Subsequently, the CGI processor 13 generates different display data depending on local access or remote access, and transmits it to the embedded web browsing portion 11 or the web browsing portion 21 of the PC 2, via the web server 12.

Figure 4:
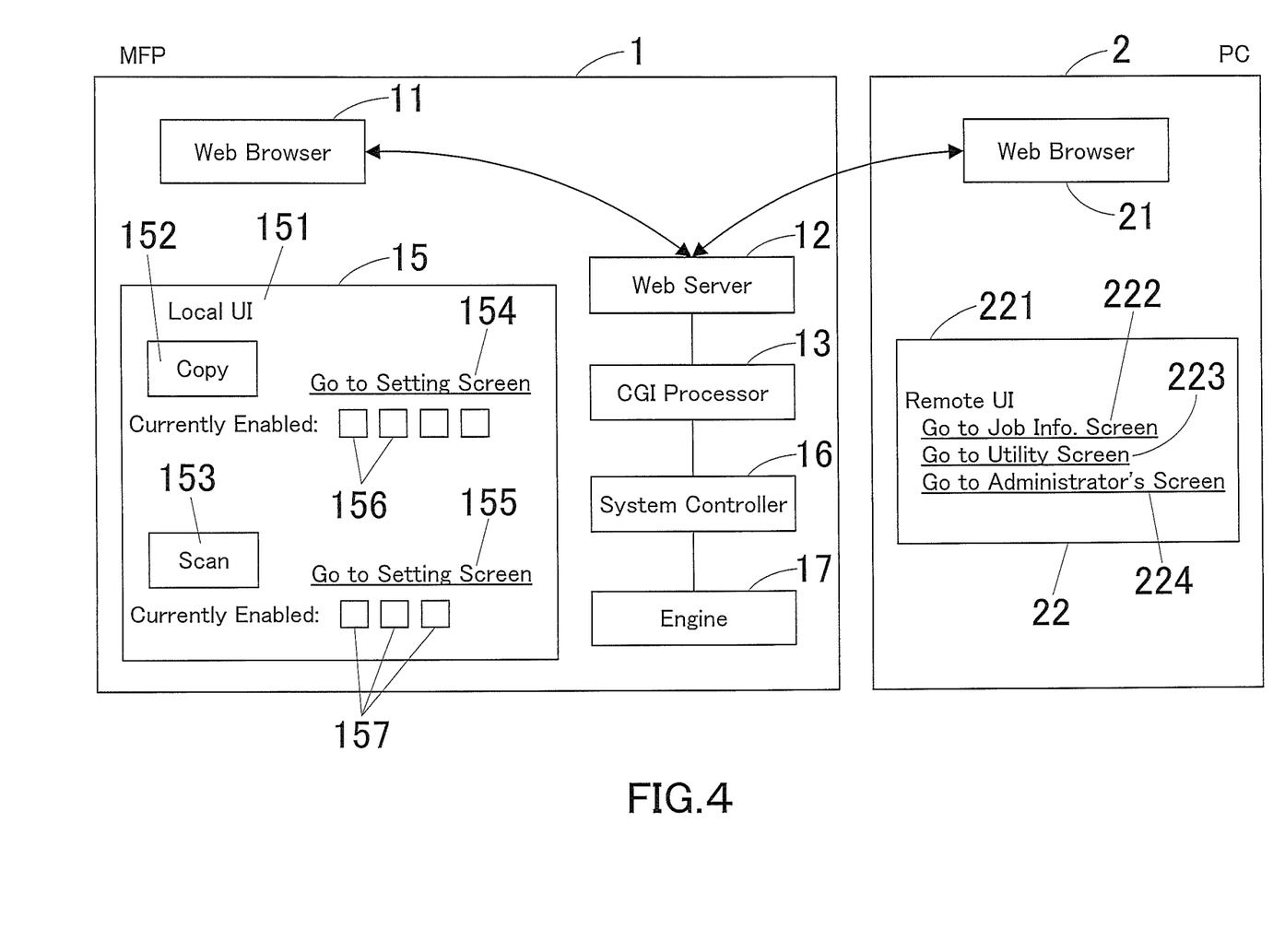
FIG. 4 is a view illustrating an example of a screen displayed on a display of an operation panel of the image forming apparatus and a display of a personal computer.

FIG. 4 is a view illustrating an example of a screen that is displayed on a display of the operation panel 15 of the image forming apparatus 1 based on the display data received by the web browsing portion 11 of the image forming apparatus 1, or displayed on a display of the PC 2 based on the display data received by the web browsing portion 21 of the PC 2.

As illustrated in FIG. 4, the image forming apparatus 1 displays on the operation panel 15 thereof, a screen 151 (referred to as "Local UI" in FIG. 4) with a copy setting area 152 and a scan setting area 153 being therein, and "Go to Setting Screen" buttons 154 and 155 to jump to a detailed setting screen and currently enabled objects 156 and 157 are displayed in the copy setting areas 152 and 153, respectively. When a user clicks on the "Go to Setting Screen" button 154 or 155, the screen will be switched to a detailed copy setting screen or a detailed scan setting screen.

Meanwhile, the PC 2 displays on the display 22 thereof, a screen 221 (referred to as "Remote UI" in FIG. 4) with a "Go to Job Info.Screen" button 222, a "Go to Utility Screen" 223, and an "Go to Administrator's Screen" button 224 being therein. When a user clicks on a preferred one among these buttons, the screen will be switched to another screen suitable for the selected button.

The display screen is different depending on local access or remote access, for the following reason.

Users are supposed to come to the image processing apparatus 1 to give an instruction relating to input/output of a document, for example, a copy, scan, or facsimile-transmission instruction, by operating the operation panel 15 thereof. Meanwhile, they often check the state of the image processing apparatus 1, check device information, confirm print execution, perform various settings, or change the settings, by operating the PC 2. The display screen is different to properly deal with each of these usages. That would improve user operability of the image forming apparatus 1.

The image forming apparatus 1 and the PC 2 or the operation panel 15 of the image forming apparatus 1 and the display 22 of the PC 2 are different from each other as the following. For example, a screen displayed on the operation panel 15 of the image forming apparatus 1 is small in size and has touch-panel functionality. Since only one user is allowed to directly use the image forming apparatus 1 at the same time, it is easy to ensure security. On the other hand, the display 22 of the PC 2 is large in size and is operated with a mouse and a keyboard. A user is allowed to remotely use the image forming apparatus 1. Since a multiple access is enabled, i.e. a plurality of users are allowed to access the image forming apparatus 1 at the same time, it is not easy to ensure security.

It is preferred to display different screens for the image forming apparatus 1 and the PC 2 so that the screens will match their characteristics, and also it is preferred to provide only their available components on the respective screens.

By the way, if the system is capable of constructing a CGI by an easy script language, users are allowed to write a program. In such a case, users are allowed to construct an arbitrary User Interface (UI) depending on their usage. However, in this mode of embodied implementation, the image forming apparatus 1 performs in a different manner depending on local access or remote access from the aspect of data security, while users intend to use it as usual.

For example, from the aspect of security, if all users construct their own CGIs by programming, the CGIs will accept a request transmitted by local access, but no request transmitted by remote access. Therefore, when a user logs on by operating the operation panel 15 of the image forming apparatus 1, he/she will obtain his/her own display screen on the operation panel 15.

Meanwhile, when a user intends to establish a remote access, the web server 12 and the CGI processor 13 reject it. In the memory 101 of the image forming apparatus 1, there are a regular program area for the image forming apparatus 1 and a CGI program area for users, in a separate manner. The web server 12 and the CGI processor 13 judge which the remote access target is, the regular CGI or the user's constructed CGI, based on the URL (Uniform Resource Locator). If the remote access target is the user's constructed CGI, it is rejected (or ignored).

Figure 5:
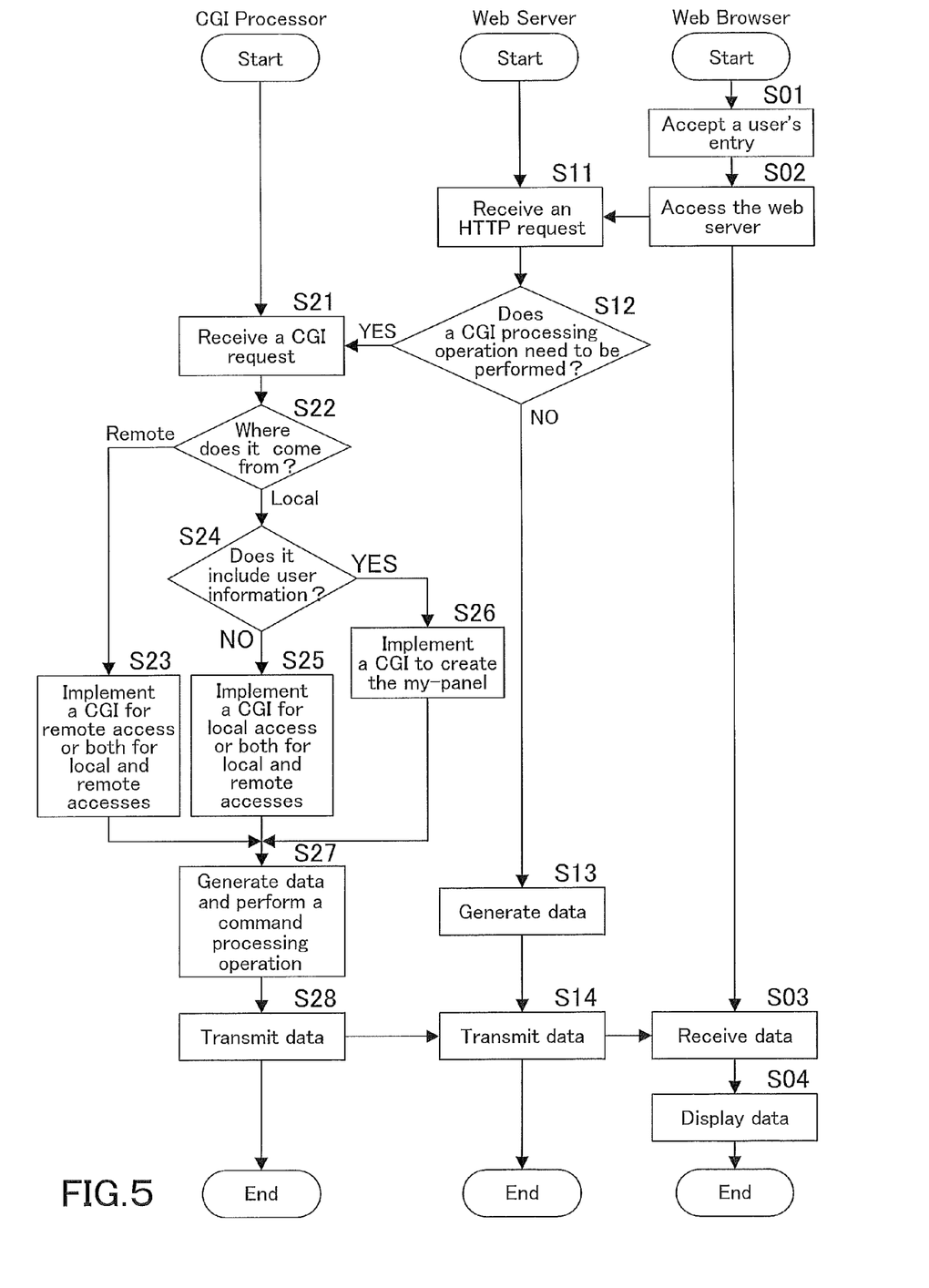
FIG. 5 is a flowchart representing operations of the image forming apparatus.

FIG. 5 is a flowchart representing operations of the image forming apparatus 1. This corresponds to processing routines that are executed by the web browsing portion 21 embedded on the image forming apparatus 1, and by the web server 12 and the CGI processor 13, according to an operation program stored on a recording medium such as the CPU 161 or the ROM 162 of the image forming apparatus 1.

In Step S01, the embedded web browsing portion 11 accepts a user's entry from the operation panel 15, or the web browsing portion 21 of the PC 2 accepts a user's entry from a keyboard or the like of the PC 2. And an access to the web server 12 is established in Step S02.

Receiving an HTTP request via the web browsing portion 11 or 21, the web server 12 judges whether or not a CGI processing operation needs to be performed, in Step S12. If a CGI processing operation needs not be performed, for example, if the request is simply to display image data (NO in Step S12), the web server 12 generates necessary data in Step S13, then transmits it to the web browsing portion 11 or 21 in Step S14.

In Step S12, if a CGI processing operation needs to be performed (YES in Step S12), the web server 12 transmits a CGI request to the CGI processor 13. The CGI processor 13 receives the CGI request from the web server 12 in Step S21, then examines where the request came from in Step S22. In other words, the CGI processor 13 judges which it was, local access or remote access.

If it was received by remote access ("Remote Access" in Step S22), an exclusive CGI for remote access or a common CGI both for remote and local accesses is implemented in Step S23. And then the routine proceeds to Step S27.

If it was received by local access ("Local Access" in Step S22), then the CGI processor 13 judges whether or not the request includes user information, in Step S24. If it does not include user information (NO in Step S24), an exclusive CGI for local access or a common CGI both for remote and local accesses in implemented in Step S25. And then the routine proceeds to Step S27. If it includes user information (YES in Step S24), since this means that the user logged on by operating the operation panel 15, the user's constructed CGI, for example, a CGI to create the user's own display panel (my-panel) is implemented in Step S26. And then the routine proceeds to Step S27.

In Step S27, while cooperatively working with the internal API of the image forming apparatus 1, the CGI processor 13 generates different data depending on the access target and performs a command processing operation. And then it transmits the data to the web server 12 in Step S28. In Step S14, the web server 12 transfers the data received from the CGI processor 13 or the data generated in Step S13, to the web browsing portion 11 of the image forming apparatus 1 or the web browsing portion 21 of the PC 2. The web browsing portion 11 or 21 receives the data from the web server 12 in Step S03, then displays the data on the operation panel 15 or the display 22 of the PC 2 in Step S04.

Alternatively, if the request was received by remote access in Step S22, the routine may be arranged as follows: the CGI processor 13 judges whether or not the request includes user information (whether or not the request is to implement the user's constructed CGI), and if it includes user information, the CGI processor 13 refuses implementation of the user's constructed CGI, and generates data to reject the remote access in Step S27, then transmits it to the PC 2 via the web server 12 in Step S28.

As described above, in this mode of embodied implementation, it is judged which it was, local access or remote access to the web server 2, and display data for local access or remote access is generated, then transmitted to the embedded web browsing portion 11 or the web browsing portion 21 of the PC 2. Therefore, different screens are displayed on the operation panel 15 and on the display 22 of the PC 2. In other words, a suitable operation screen for the access target is displayed on the operation panel 15 or the display 22 of the PC 2, which would improve user operability.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a display;
an embedded web browser that displays hypertext-coded information on the display;
an access accepting portion that can be accessed from the embedded web browser and another web browser of an external machine;
a judgment portion that judges the access accepting portion is accessed from: (i) the embedded web browser, or (ii) the web browser of the external machine;
a data generator that generates: first display data if the judgment portion judges that the access accepting portion is accessed from the embedded web browser; and second display data if the judgment portion judges that the access accepting portion is accessed from the web browser of the external device, the second display data being different from the first display data; and
a transmitter that transmits the first display data generated by the data generator, to the embedded web browser when the judgment portion judges that the access accepting portion is accessed from the embedded web browser; and transmits the second display data generated by the data generator, to the web browser of the external machine when the judgment portion judges that the access accepting portion is accessed from the web browser of the external machine.

2. The image processing apparatus recited in claim 1, wherein the access accepting portion includes a web server and a Common Gateway Interface (CGI) processor that executes processing according to a request received by the web server.

3. The image processing apparatus recited in claim 1, further comprising a memory that stores a CGI program made by a user, the CGI program to make the data generator generate display data for the user, wherein if there is an access from the web browser of the external machine to reach the display data generated by the data generator in accordance with the CGI program stored on the memory, the access is rejected by the access accepting portion.

4. A data processing method for an image processing apparatus comprising:
judging an access accepting portion is accessed from: (i) an embedded web browser displaying hypertext-coded information on a display, or (ii) another web browser of an external machine;
generating first display data if the judgment judges that the access accepting portion is accessed from the embedded web browser; and second display data if the judgment judges that the access accepting portion is accessed from the web browser of the external device, the second display data being different from the first display data; and
transmitting the first display data to the embedded web browser when the judgment judges that the access accepting portion is accessed from the embedded web browser; and transmits the second display data to the web browser of the external machine when the judgment portion judges that the access accepting portion is accessed from the external machine.

5. The data processing method recited in claim 4, wherein the access accepting portion includes a web server and a Common Gateway Interface (CGI) processor that executes processing according to a request received by the web server.

6. The data processing method recited in claim 4, further comprising storing a CGI program made by a user, the CGI program generating display data for the user, wherein if there is an access from the web browser of the external machine to reach the display data generated in accordance with the stored CGI program, rejecting the access with the access accepting portion.

7. A non-transitory computer-readable recording medium having a data processing program stored thereon to make a computer of an image processing apparatus execute:
judging an access accepting portion is accessed from: (i) an embedded web browser displaying hypertext-coded information on a display, or (ii) another web browser of an external machine;
generating first display data if the judgment judges that the access accepting portion is accessed from the embedded web browser; and second display data if the judgment judges that the access accepting portion is accessed from the web browser of the external device, the second display data being different from the first display data; and
transmitting the first display data to the embedded web browser when the judgment judges that the access accepting portion is accessed from the embedded web browser; and transmits the second display data to the web browser of the external machine when the judgment portion judges that the access accepting portion is accessed from the external machine.

8. The recording medium having the data processing program stored thereon according to claim 7, whereby the access accepting portion includes a web server and a Common Gateway Interface (CGI) processor that executes processing according to a request received by the web server.

9. The recording medium having the data processing program stored thereon according to claim 7, further comprising storing a CGI program made by a user, the CGI program generating display data for the user, wherein if there is an access from the web browser of the external machine to reach the display data generated in accordance with the stored CGI program, rejecting the access with the access accepting portion.

* * * * *